United States Patent
Grayson

[11] Patent Number: 6,129,836
[45] Date of Patent: Oct. 10, 2000

[54] TWO-CHAMBER FLUID CONTROL VALVE AND WATER SOFTENER INCORPORATING SAME

[75] Inventor: John R. Grayson, Inverness, Ill.

[73] Assignee: RSWC, Inc., Inverness, Ill.

[21] Appl. No.: 09/122,723

[22] Filed: Jul. 27, 1998

[51] Int. Cl.[7] .................................................. B01J 49/00
[52] U.S. Cl. ........................... 210/67; 137/398; 137/423; 137/428; 137/896; 210/126; 210/127; 210/191; 521/26
[58] Field of Search ..................... 137/398, 423, 137/428, 896; 210/670, 126, 127, 128, 134, 136, 190, 191, 198.1; 521/26

[56] References Cited

U.S. PATENT DOCUMENTS

| | | | |
|---|---|---|---|
| 330,148 | 11/1885 | Paine | 137/247.17 |
| 1,062,537 | 5/1913 | Culbertson | 137/409 |
| 2,113,490 | 4/1938 | Newbery | 137/387 |
| 3,202,174 | 8/1965 | Rudelick | 137/432 |
| 3,211,166 | 10/1965 | White | 137/99 |
| 3,228,416 | 1/1966 | Prosser et al. | 137/423 |
| 3,255,106 | 6/1966 | Reid et al. | 210/673 |
| 3,306,450 | 2/1967 | Kryzer et al. | 210/134 |
| 3,306,504 | 2/1967 | Tischler | 222/442 |
| 3,308,955 | 3/1967 | Robarge | 210/139 |
| 3,342,338 | 9/1967 | Selmeczi et al. | 210/191 |
| 3,363,642 | 1/1968 | Grayson | 137/399 |
| 3,380,590 | 4/1968 | Grayson | 210/134 |
| 3,487,933 | 1/1970 | Hood et al. | 210/134 |
| 3,528,587 | 9/1970 | Popinski | 222/56 |
| 3,584,764 | 6/1971 | Elkins | 222/67 |
| 3,655,097 | 4/1972 | Booth et al. | 222/129.4 |
| 3,872,004 | 3/1975 | Grout et al. | 210/127 |
| 4,015,621 | 4/1977 | Laxo | 137/173 |
| 4,089,470 | 5/1978 | Strahman | 239/304 |
| 4,090,964 | 5/1978 | Bakken et al. | 210/134 |
| 4,193,417 | 3/1980 | Bowman et al. | 137/192 |
| 4,215,719 | 8/1980 | Laar et al. | 137/563 |
| 4,228,000 | 10/1980 | Hoeschler | 210/673 |
| 4,374,025 | 2/1983 | Loke | 210/140 |
| 4,764,280 | 8/1988 | Brown et al. | 210/662 |
| 5,082,557 | 1/1992 | Grayson et al. | 210/109 |
| 5,365,970 | 11/1994 | Butler | 137/192 |
| 5,628,431 | 5/1997 | Roach et al. | 222/145.5 |

*Primary Examiner*—Ivars Cintins
*Attorney, Agent, or Firm*—Seyfarth Shaw

[57] ABSTRACT

A two-chamber fluid control valve for a water softener system is provided. The valve includes a primary chamber having a primary inlet for passage of a primary fluid into the primary chamber and a primary outlet for passage of fluid out of the primary chamber, and a primary valve member disposed for closing the primary outlet. The valve also includes a secondary chamber having a secondary inlet and a secondary outlet fluidly communicating with, and for passing the secondary fluid into, the primary chamber, and a secondary valve member disposed for closing the secondary outlet to prevent the passage of air out of the secondary chamber and into the primary chamber, whereby primary and secondary fluids can be combined in the primary chamber prior to flowing out of the primary outlet of the primary chamber. The valve allows a homogeneous brine/secondary chemical solution to be formed therein and fed to a water softener tank to regenerate and treat the tank and the ion exchange medium therein.

20 Claims, 3 Drawing Sheets

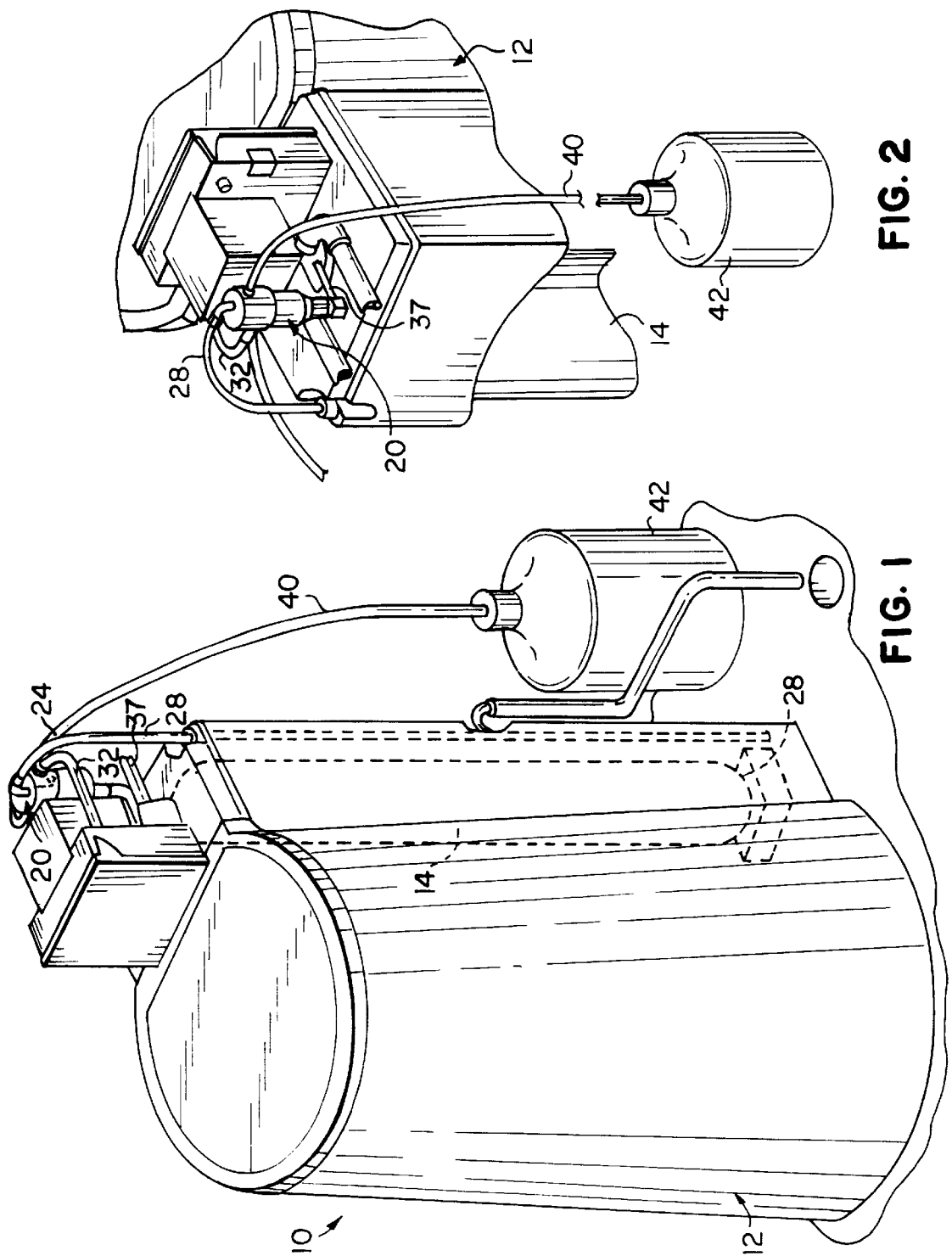

TWO-CHAMBER FLUID CONTROL VALVE AND WATER SOFTENER INCORPORATING SAME

BACKGROUND OF THE INVENTION

1. Field of the Invention

This invention relates to water softener systems, and more particularly, to valves for controlling the flow of fluids to the system's water softener tank.

2. Description of the Prior Art

The ion exchange media of water softener tanks are typically regenerated by brine solutions. Additionally, it is often necessary to add a secondary chemical solution to further treat the ion exchange medium and/or the tank containing the ion exchange medium. In the past, the addition of these secondary fluids often was done by manually inserting a batch-wise plug of fluid directly into the water softener tank or into the brine being fed to the tank. This method of secondary chemical solution addition had several problems. Most importantly, it did not allow a combined mixture of brine and secondary chemical to continuously flow through and regenerate the water softener tank. This batch-type addition quickly flowed through the water softener tank and often did not provide adequate time for the secondary chemical solution to reside and react in the tank to adequately achieve its purpose.

SUMMARY OF THE INVENTION

It is a general object of the invention to provide an improved water treatment system which avoids the disadvantages of prior systems while affording structural and operational advantages.

An important feature of the invention is the provision of a dual chamber fluid control valve for controlling the flow of liquids to and through a water softener tank, which is of relatively simple and economical construction.

A still further feature of the invention is the provision of a valve of the type set forth which allows for a homogeneous brine/secondary chemical solution to be formed therein and fed to the water softener tank.

Another feature of the present invention is the provision of a valve of the type set forth which allows the secondary chemical solution to remain in the water softener tank long enough to adequately react therein.

Yet another feature of the invention is the provision of a valve of the type set forth which requires little manual operation.

Certain ones of these and other features of the invention may be attained by providing a two-chamber fluid control valve for a water softener system. The valve includes a primary chamber having a first primary inlet for passage of a primary fluid into the primary chamber and a primary outlet for passage of fluid out of the primary chamber, and a primary valve member disposed and closing the primary outlet. The valve also includes a secondary chamber having a secondary inlet and a secondary outlet fluidly communicating with and for passing the secondary fluid into the primary chamber and a secondary valve member disposed for closing the secondary outlet, whereby the primary and the secondary fluids flowing into the primary chamber can be combined in the primary chamber prior to flowing out of the primary outlet of the primary chamber.

Other features of the invention may be attained by providing a water softener incorporating a valve of the type set forth.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of the water treatment system of the present invention;

FIG. 2 is an enlarged, fragmentary, perspective view of the dual-chamber fluid control valve of the system of FIG. 1;

DETAILED DESCRIPTION OF THE PREFERRED EMBODIMENTS

Figure 4:
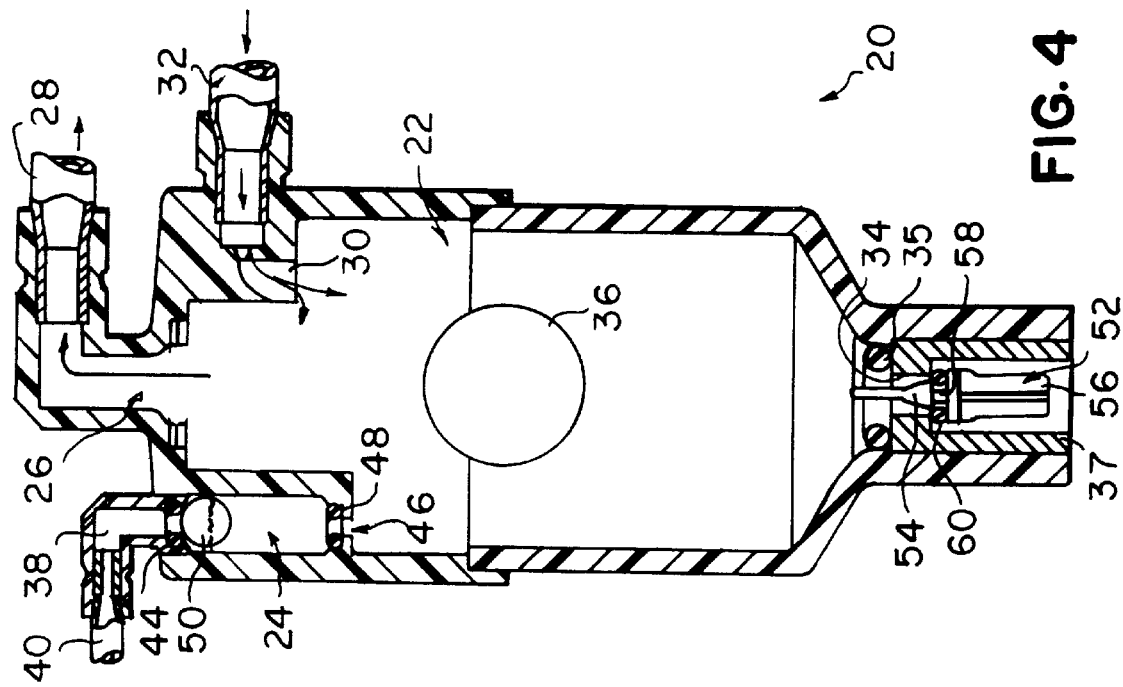
FIG. 4 is a view similar to FIG. 3 illustrating water passing through the valve to the brine tank to form brine therein.

As seen in FIG. 1, a water treatment (or softener) system 10 is provided, which includes a brine cabinet 12 for storing salt and for forming (from the salt) and storing brine therein. The water treatment system 10 also includes a water softener tank 14 disposed in the brine tank 12 in a known manner. The water softener tank 14 includes an ion exchange medium for treating tap water.

Referring also to FIGS. 2–6, the water treatment system 10 also includes a dual-chamber fluid control valve 20, which includes a larger volume primary chamber 22 and a smaller volume secondary chamber 24. The primary chamber 22 includes a primary inlet/outlet 26 fluidly connected to the brine tank 12 by a conduit 28. As seen in FIG. 1, conduit 28 terminates at a free end near the bottom of the brine tank 12. As discussed further below, conduit 28 is used to suck up brine stored at the bottom of the tank 12 into the valve 20. As best seen in FIGS. 3–6, the primary chamber 22 also includes a second inlet 30 coupled to a water source by conduit 32. The primary chamber 22 additionally includes an outlet 34 including an o-ring 35 forming a valve seat. The primary chamber 22 also has a float ball 36 disposed therein. A conduit 37 fluidly couples the outlet 34 to a main valve (not shown) of the water treatment system 10 and the water softener tank 14.

The secondary chamber 24 includes a secondary inlet 38 fluidly coupled by a conduit 40, such as a microbore tubing, to a secondary chemical storage tank 42. This secondary inlet 38 includes an o-ring 44 forming a seat. The secondary chamber 24 also includes a secondary outlet 46 including an o-ring 48 forming another seat. The secondary outlet 46 fluidly communicates with the primary chamber 22. The secondary chamber 24 also has a float ball 50 disposed therein.

The dual chamber fluid control valve 20 also includes a moveable poppet 52 having a substantially frustoconical-shaped upper end 54, a lower end 56 and a groove 58 disposed therebetween. An o-ring 60 is disposed in the groove 58. The main valve of the water treatment system 10, via an eductor thereof, or the like, can create suction or pressure in conduit 37 to move the poppet 52 to or from a closed position with respect to outlet 34 in a known manner, such as discussed in U.S. Pat. Nos. 3,380,590 and 3,363,642, the specifications of which are incorporated herein by reference.

Figure 3:
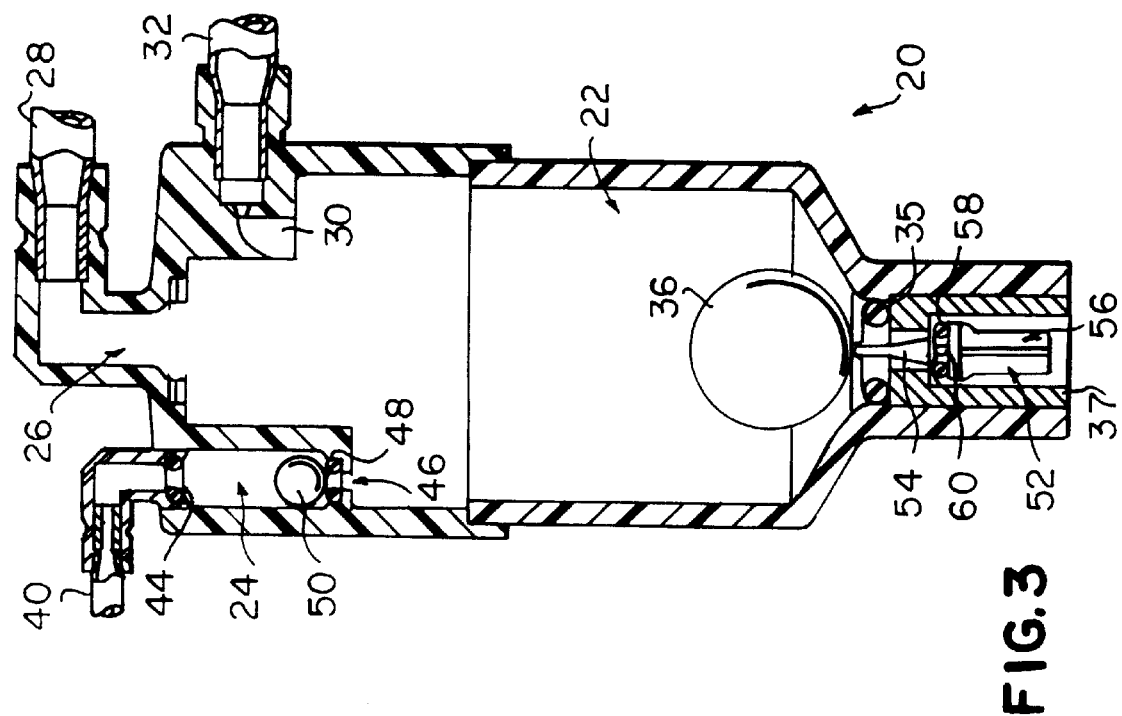
FIG. 3 is a further enlarged vertical sectional view of the dual-chamber fluid control valve of FIG. 2 when the primary and secondary chambers are empty.

FIGS. 3–6 illustrate the valve 20 in various modes of operation. FIG. 3 illustrates the valve 20 when it is not being used. In this mode, the main valve is exerting pressure in the conduit 37 such that the poppet 52 is disposed in the closed position against the bottom of the outlet 34 so that the o-ring 60 and poppet 52 form a substantially fluid-tight seal therebetween. The chambers 22 and 24 are empty and the float ball 36 rests on the upper end 54 of the poppet 52, while the float ball 50 rests on the o-ring 48, closing the outlet 46.

FIG. 4 illustrates the valve 20 when water is being fed into primary chamber 22 through conduit 32 and inlet 30 and then out of the primary chamber 22 through primary inlet/outlet 26 and conduit 28 to the brine tank 12 to form brine. During this mode of operation, when water enters the secondary chamber 24, float ball 50 floats upward on the water and, if necessary, forms a seal with o-ring 44 to prevent water from flowing through secondary inlet 38 and into the secondary chemical storage tank 42. Simultaneously, the o-ring 60 of the poppet 52 maintains a seal with the bottom of the outlet 34 to prevent water from flowing into the water softener tank 14.

After the brine tank 12 has been filled with water and after brine has been formed in the brine tank 12, in a known manner, the brine may be used, as necessary, to regenerate the ion exchange medium in the water softener tank 14. Additionally, a secondary chemical solution stored in the secondary chemical storage tank 42 may be passed to the water softener tank 14. The secondary solution may include a solubilizing reducing agent to solubilize any solid iron in the tank or a sanitizing agent, such as a chlorine, iodine or chloramine solution, to kill and prevent the formation of bacteria.

Figure 5:
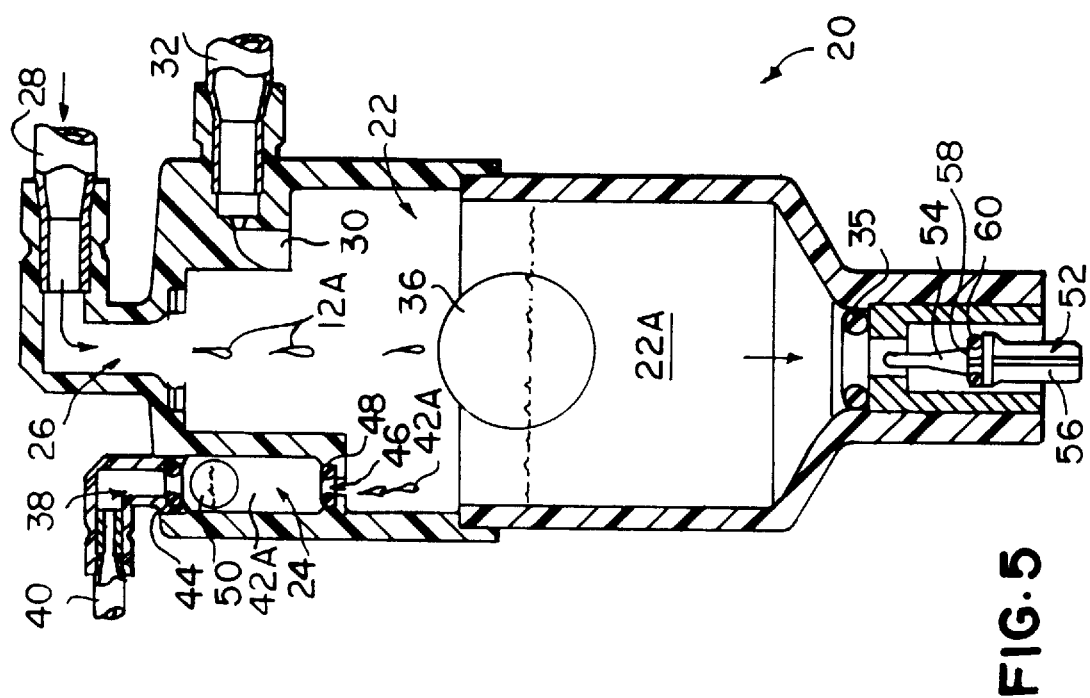
FIG. 5 is a view similar to FIG. 3 illustrating the valve when a homogeneous regenerant stream is being passed to the water softener tank.

As seen in FIG. 5, the valve 20 is in a mode to provide the water softener tank with a homogeneous mixture of brine and secondary chemical solution to regenerate the tank. The primary chamber 22 of the valve 20 is being fed with brine 12A from brine tank 12 through conduit 38 and primary inlet/outlet 26. Simultaneously, the primary chamber 22 is being fed with a secondary chemical solution 42A through the secondary outlet 46 of the secondary chamber 24, which is being fed from the secondary chemical storage tank 42 through conduit 40 and secondary inlet 38. The secondary solution 42A and brine 12A form a homogeneous mixture 22A in the primary chamber 22, which is then fed out of outlet 34 to the water softener tank 14 to regenerate the ion exchange medium and react otherwise, as necessary. In this mode, the main valve has created suction in conduit 37 which, together with gravity, has moved the poppet 52 away, in a known manner, from the bottom of outlet 34 to allow passage of the mixture (via the created suction) through outlet 34, conduit 37 and into the water softener tank coupled therewith. The rates of flow of the secondary fluid 42A, brine 12A and homogeneous mixture 22A into and out of the primary chamber 22 is controlled by the eductor of the main valve and the length and internal dimensions of conduits 28, 37 and 40, in a known manner.

Typically, the flow rates of the brine 12A and secondary fluid 42A and conduit dimensions are determined as follows. The size of conduits 28 and 37 are maintained as constants to obtain a constant flow rate of brine 12A. Based upon this flow rate, the length of time the brine 12A must be sucked into the water softener tank 14 to regenerate the ion exchange medium therein can be determined. Then, based upon the amount of secondary solution necessary to treat the water softener tank 14 (and the concentration of the active ingredients of the secondary solution), the flow rate of the secondary solution 42A is determined and the length and internal dimensions of conduit 40 are adjusted to achieve this flow rate.

Figure 6:
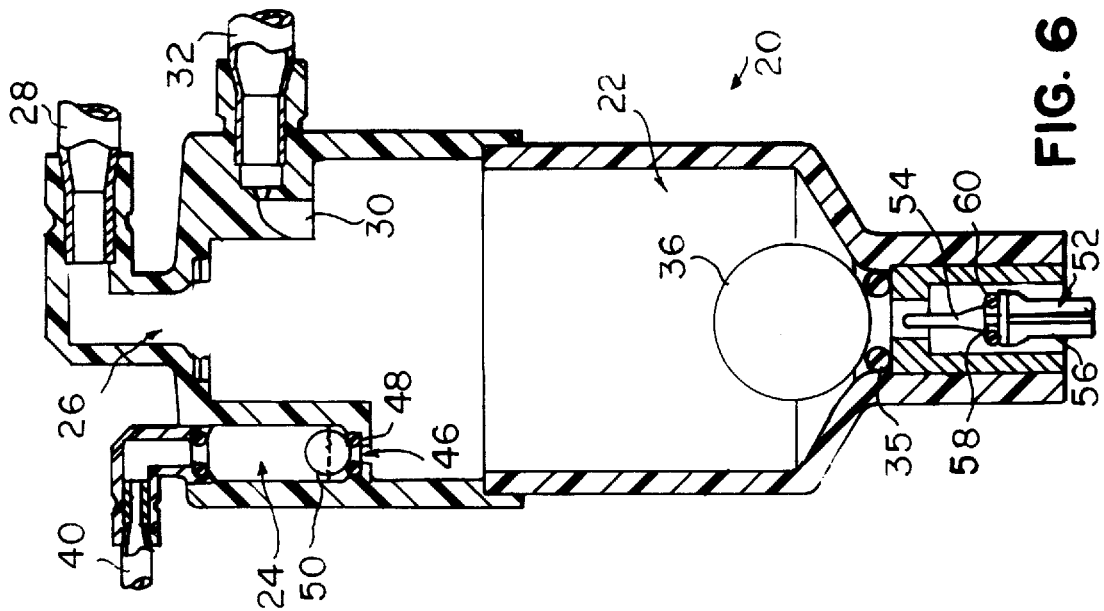
FIG. 6 is a view similar to FIG. 3 after the primary and secondary solutions have been depleted.

FIG. 6 illustrates the valve 20 after the primary and secondary chambers 22 and 24 have been substantially emptied of fluids. The float ball 50 in the secondary chamber 24 is disposed on o-ring 44 and forms a seal therewith preventing air from flowing into the primary chamber 22, and float ball 36 is disposed on o-ring 35 and forms a seal therewith preventing air from flowing into the water softener tank.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A two-chamber fluid control valve for a water softening system comprising:

a primary chamber having a first primary inlet for passage of a primary fluid into the primary chamber and a primary outlet for passage of fluid out of the primary chamber;

a primary valve member disposed within and freely movable within the primary chamber for closing the primary outlet;

a secondary chamber having a secondary inlet for passage of a secondary fluid into the secondary chamber and a secondary outlet fluidly communicating with, and for passing the secondary fluid into the primary chamber; and a secondary valve member disposed within and freely movable within the secondary chamber for closing the secondary outlet, whereby the primary and the secondary fluids can be combined in the primary chamber prior to flowing out of the primary outlet.

2. The valve of claim 1, wherein the primary and secondary valve members are floats.

3. The valve of claim 2, wherein the primary and secondary valve members are float balls.

4. The valve of claim 1, wherein the primary chamber and secondary chamber respectively have first and second volumes and the first volume is greater than the second volume.

5. The valve of claim 4, wherein the primary and secondary valve members are respectively first and second float balls, wherein the first float ball has a larger volume than the second float ball.

6. The valve of claim 1, wherein the primary chamber has a second primary inlet fluidly connected to the first primary inlet.

7. The valve of claim 1, wherein the secondary valve member is disposed for closing the secondary inlet.

8. The valve of claim 1, and further comprising a valve member disposed outside the primary chamber for preventing the passage of fluid out of the primary outlet.

9. A water softening system comprising:

a brine tank for forming and storing brine;

a water softener tank for treating water;

a secondary chemical storage tank for storing a secondary chemical; and a two-chamber fluid control valve comprising:

a primary chamber having a first primary inlet fluidly coupled to the brine tank for passage of brine into the primary chamber and a primary outlet for passage of fluid out of the primary chamber and into the water softener tank, and a primary valve member disposed for closing the primary outlet, and a secondary chamber having a secondary inlet for passage of the secondary chemical into the secondary chamber and a secondary outlet fluidly communicating with, and for passing the secondary chemical into, the primary chamber, and a secondary valve member disposed for closing the secondary outlet, whereby the brine and the secondary chemical can be combined in the primary chamber prior to flowing out of the primary outlet.

10. The system of claim 9, wherein the primary chamber and secondary chamber respectively have first and second volumes and the first volume is greater than the second volume.

11. The system of claim 9, wherein the primary chamber has a second primary inlet fluidly connected to a water source and to the first primary inlet.

12. The system of claim 9, wherein the secondary valve member is disposed for closing the secondary inlet.

13. The system of claim 9, wherein the primary and secondary valve members are respectively floatable in the brine and secondary chemical.

14. The system of claim 13, wherein the primary and secondary valve members are float balls.

15. A process of providing a multi-part regenerant stream to a water softener tank comprising the steps of:

introducing a primary fluid to a primary chamber of a two-chamber liquid control valve;

introducing a secondary fluid to a secondary chamber of the two-chamber liquid control valve;

passing the secondary fluid to the primary chamber from the secondary chamber;

mixing the primary and secondary fluids in the primary chamber to form a multi-part regenerant stream; and passing the multi-part regenerant stream from the primary chamber to the water softener tank.

16. The process of claim 15, wherein the mixing includes forming a substantially homogeneous multi-part regenerant stream.

17. The process of claim 15, wherein the primary fluid is brine.

18. The process of claim 15, wherein the step of introducing a primary fluid to the primary chamber includes controlling the rate of flow of primary fluid into the primary chamber.

19. The process of claim 15, wherein the step of introducing a secondary fluid to the primary chamber includes controlling the rate of flow of secondary fluid into the primary chamber.

20. The process of claim 15, and further comprising the step of substantially preventing flow of air from the secondary chamber to the primary chamber.

* * * * *